US012450190B1

United States Patent
Amarjit et al.

(10) Patent No.: US 12,450,190 B1
(45) Date of Patent: Oct. 21, 2025

(54) DATA STORAGE DEVICE AND METHOD FOR INCREASING RANDOM INPUT-OUTPUT OPERATIONS PER SECOND (IOPS)

(71) Applicant: Sandisk Technologies, Inc., Milpitas, CA (US)

(72) Inventors: Kumar Amarjit, Bangalore (IN); Akshay Teeka Srinivas, Bangalore (IN); Mohammad Talib Khan, Bangalore (IN); Siva Krishna Vunnam, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 28 days.

(21) Appl. No.: 18/642,976

(22) Filed: Apr. 23, 2024

(51) Int. Cl.
  *G06F 13/42* (2006.01)
(52) U.S. Cl.
  CPC ................................ *G06F 13/4282* (2013.01)
(58) Field of Classification Search
  CPC .................................................. G06F 13/4282
  See application file for complete search history.

(56) References Cited

U.S. PATENT DOCUMENTS

| | | | |
|---|---|---|---|
| 7,831,755 B2 | 11/2010 | Yun et al. | |
| 8,292,177 B2 | 10/2012 | Elhamias et al. | |
| 9,830,261 B2 | 11/2017 | Jiang et al. | |
| 10,467,175 B1 | 11/2019 | Haldar et al. | |
| RE48,736 E | 9/2021 | Fujimoto | |
| 2007/0156998 A1* | 7/2007 | Gorobets | G06F 12/0246 711/170 |
| 2007/0230690 A1* | 10/2007 | Elhamias | H04L 9/0637 380/37 |
| 2013/0275767 A1* | 10/2013 | Furuhashi | G06F 12/1408 713/189 |
| 2014/0089610 A1* | 3/2014 | Strauss | G06F 3/0634 711/154 |
| 2015/0081626 A1* | 3/2015 | Yang | G11B 20/10009 707/610 |
| 2015/0347291 A1* | 12/2015 | Choi | G06F 12/0246 711/103 |
| 2021/0011642 A1* | 1/2021 | Lee | G06F 3/0659 |
| 2021/0081115 A1* | 3/2021 | Clarke | G06F 3/0659 |
| 2021/0279174 A1* | 9/2021 | Peterson | G06F 11/3037 |
| 2024/0319918 A1* | 9/2024 | Lee | G06F 3/061 |
| 2025/0061080 A1* | 2/2025 | Wang | G06F 13/4282 |

* cited by examiner

*Primary Examiner* — Henry Tsai
*Assistant Examiner* — Harry Z Wang
(74) *Attorney, Agent, or Firm* — Crowell & Moring LLP

(57) ABSTRACT

Data storage devices with an open-ended protocol can be limited in terms of input-output operations per second (IOPS) due to time spent on stop-transmission clean-up activities. A data storage device is disclosed that can increase IOPS by using command length estimation logic that stores/remembers the command length of a previous write/read command and restricts the next open-ended read/write command to the predicted/remembered length. This increases IOPS by eliminating a need to perform a stop-transmission clean-up activity.

19 Claims, 7 Drawing Sheets

Read

| Capacity | | Without CMD Length Estimation Logic: Read 4K IOPS | With CMD Length Estimation Logic: Read 4K IOPS | % Improvement | Avg Improvement |
|---|---|---|---|---|---|
| 1D | | 1677.2 | 3292 | 96% | 90% |
| | | 1788.3 | 3293.2 | 84% | |
| 2D | | 1645.8 | 2853.8 | 73% | 73% |
| | | 1653.6 | 2859.9 | 73% | |

FIG. 4

Write

| Capacity | Without CMD Estimation Write 4K IOPS | With CMD Estimation Write 4K IOPS | % Improvement | Avg Improvement |
|---|---|---|---|---|
| 1D | 817 | 877 | 7.4% | 7.65% |
| 1D | 820 | 886 | 7.9% | 7.65% |
| 2D | 813 | 922 | 13.4% | 11.55% |
| 2D | 828 | 909 | 9.7% | 11.55% |

FIG. 5

DATA STORAGE DEVICE AND METHOD FOR INCREASING RANDOM INPUT-OUTPUT OPERATIONS PER SECOND (IOPS)

BACKGROUND

In some data storage devices, such as Secure Digital (SD) and microSD memory cards, "Application Performance Class" indicates the minimum random read and write performance of the data storage device. A data storage device with an "A1" rating has a minimum random read speed of 1,500 input-output operations per second (IOPS) and a write speed of 500 IOPS.

BRIEF DESCRIPTION OF THE DRAWINGS

FIG. 4 is a table that illustrates an improvement of an embodiment for random read commands.

FIG. 5 is a table that illustrates an improvement of an embodiment for random write commands.

DETAILED DESCRIPTION

The following embodiments generally relate to a data storage device and method for increasing random input-output operations per second (IOPS). In one embodiment, a data storage device is provided comprising a memory and one or more processors. The one or more processors, individually or in combination, are configured to: store a length of a previously-received read or write command; receive, from a host, an open-ended read or write command; and restrict the open-ended read or write command to the length of the previously-received read or write command, wherein restricting the open-ended read or write command to the length of the previously-received read or write command increases input-output operations per second (IOPS) by eliminating a need to perform a stop-transmission clean-up activity.

In another embodiment, a method is provided that is performed in a data storage device comprising a memory and a controller. The method comprises: determining whether a length of an open-ended read/write command is predicted; in response to determining that the length of the open-ended read/write command is predicted: sending a portion of the read/write command with a predicted length to low-level firmware in the controller; determining whether a stop transmission (ST) command was received; and in response determining that the stop transmission (ST) command was received: calculating an actual length of the read/write command; and updating a prediction data structure for upcoming commands.

In yet another embodiment, a data storage device is provided comprising: a memory; and means for restricting an open-ended read/write command to a length of a previously-received read/write command to increase input-output operations per second (IOPS) by eliminating a need to perform a stop-transmission clean-up activity.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1A:
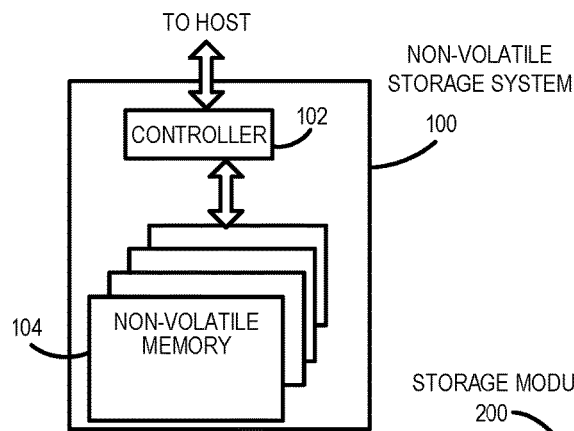
FIG. 1A is a block diagram of a data storage device of an embodiment.
Figure 1B:
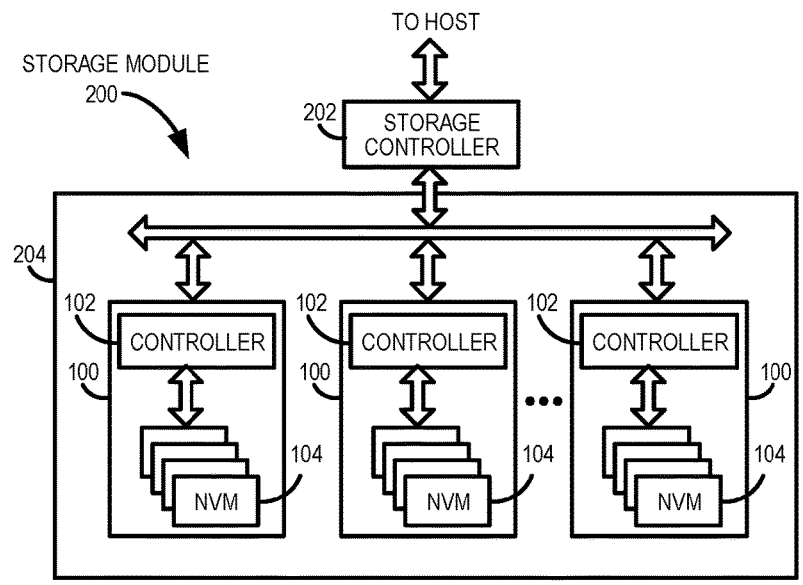
FIG. 1B is a block diagram illustrating a storage module of an embodiment.
Figure 1C:
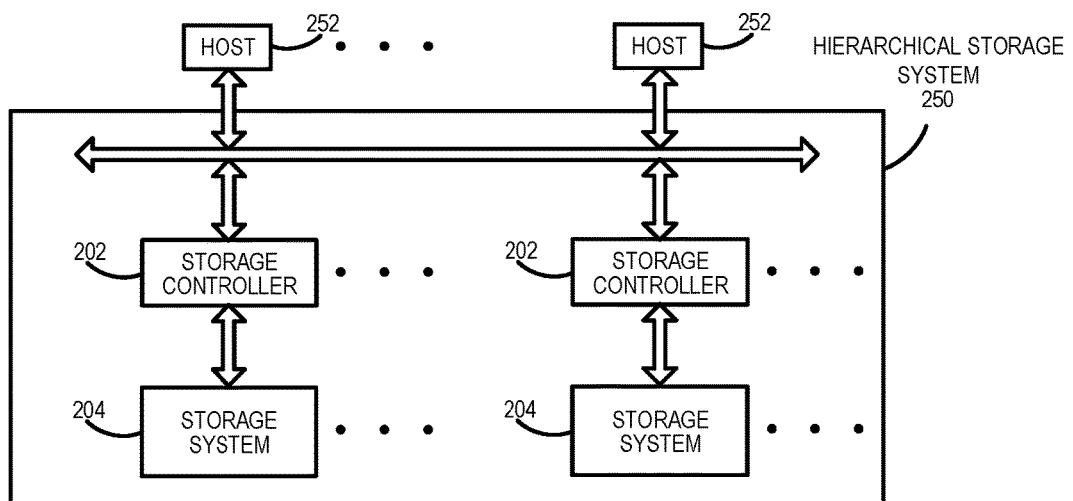
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
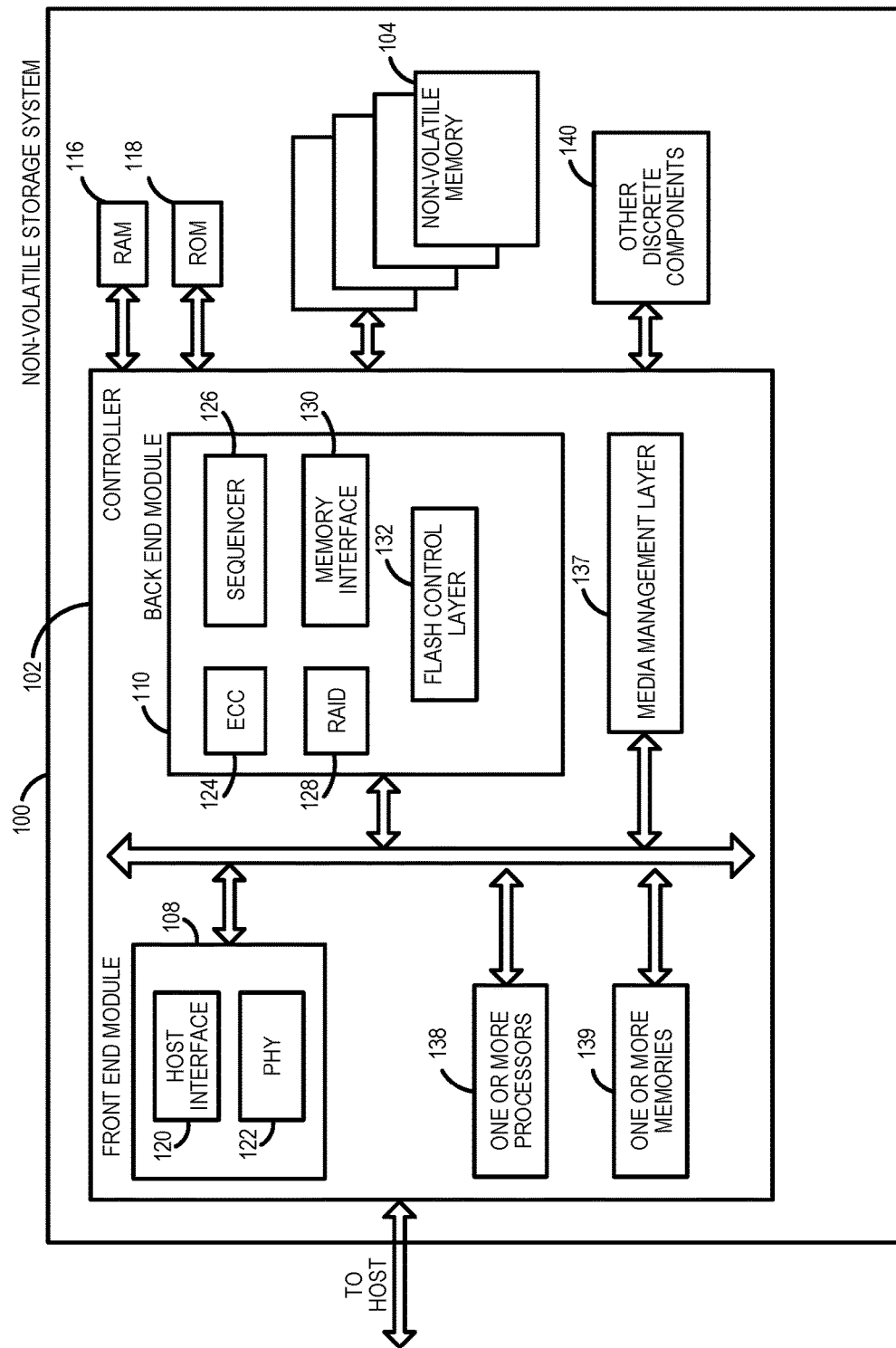
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
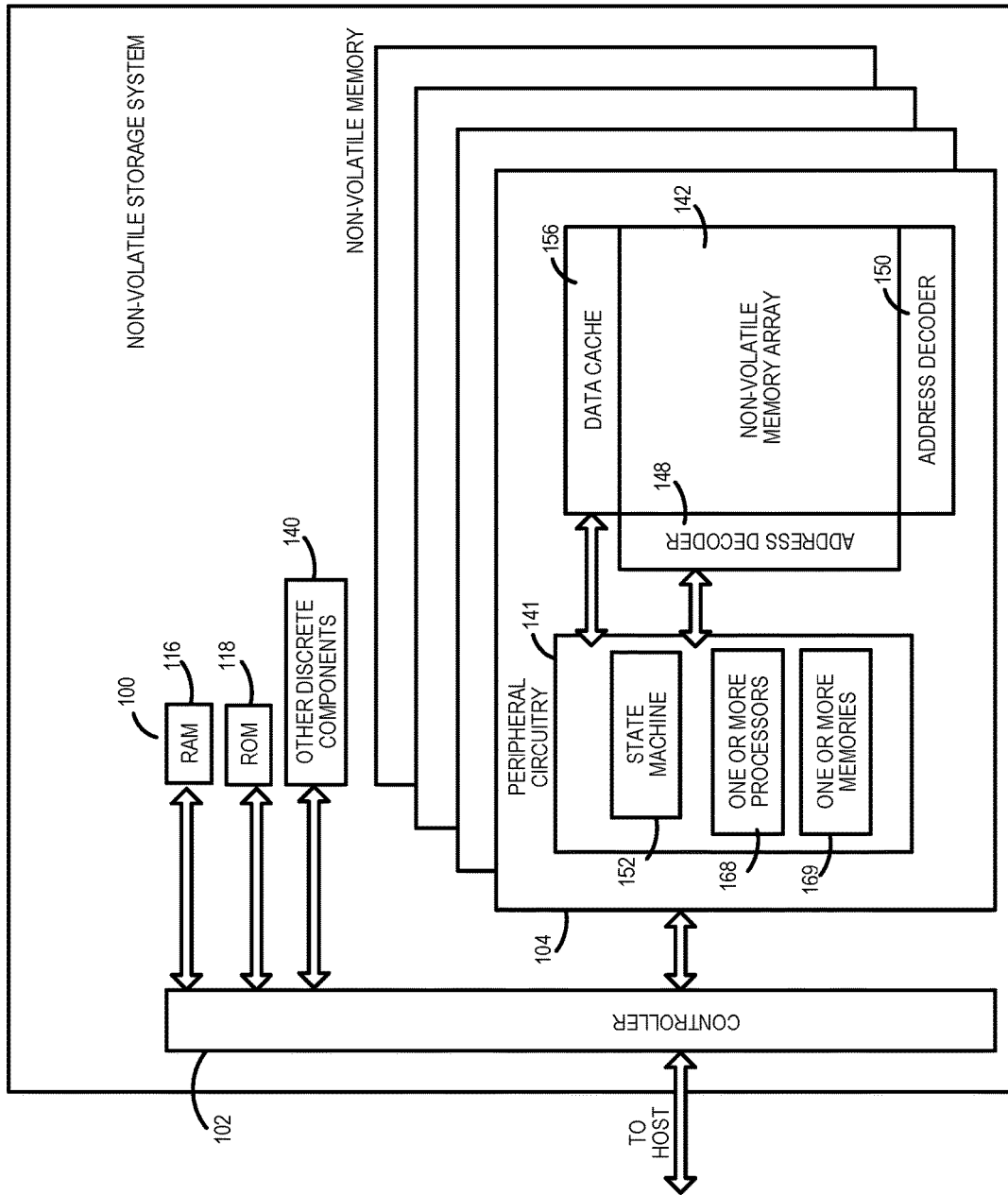
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
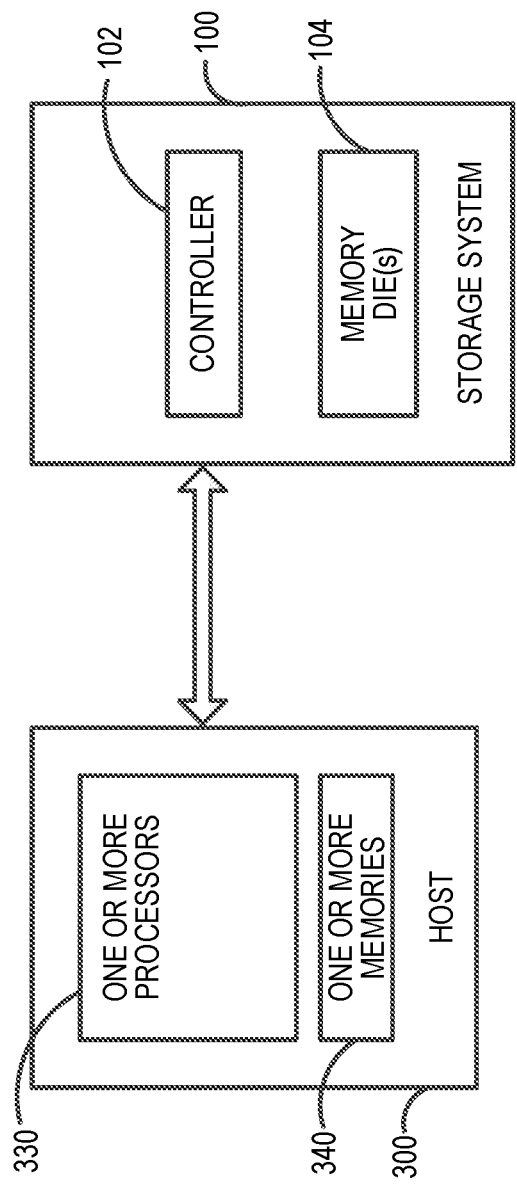
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, in some data storage devices, such as Secure Digital (SD) and microSD memory cards, "Application Performance Class" indicates the minimum random read and write performance of the data storage device. A data storage device with an "A1" rating has a minimum random read speed of 1,500 input-output operations per second (IOPS) and a write speed of 500 IOPS. Also, in data storage devices that have an open-ended protocol (e.g., SD memory cards), the controller of the data storage device can provide extra low-density parity check (LDPC) code and flash interface module (FIM) descriptors in advance. Once the host sends a stop transmission (ST) signal, the controller of the data storage device can perform a clean-up activity to make the LDPC engine/FIM/memory ready for the next command. In one example, this clean-up can add approximately 100 microseconds of overhead on every open-ended read/write command, which in-turn impacts the A1 random read/write performance.

To address this problem, in the following embodiments, the controller 102 (e.g., one or more processors) of the data storage device 100 is configured with command length estimation logic that stores/remembers the command length of a previous write/read command and restricts the next open-ended read/write command to the predicted/remembered length. This way, the controller 102 does not have to handle stop-transmission-related clean-up activities (e.g., FIM, LDPC, NAND reset), which, in-turn, increases A1 random IOPS. FIGS. 4 and 5 are tables that illustrate an example of this improvement for random read and write commands, respectively. As illustrated in these tables, using command length estimation logic can provide a significant improvement in A1 read/write IOPS. It should be noted that the data storage device 100 can be used in any suitable application (e.g., a camera, an internet-of-things (IoT) device, etc.).

Any suitable method can be used to calculate host read length. The following describes one example algorithm. It is important to note that this is merely one example and that other implementations can be used. This example will be illustrated in conjunction with an open-ended read command (e.g., 0x100 start, length—open ended—). In this example, the controller 102 is not aware of the incoming read length, and the controller 102 prepares extra read descriptors until it receives a stop transmission (ST) signal from the host 300.

So, to start, the host 300 sends the open-ended read command (0x100, —length not given—). The controller 102 prepares the FIM and LDPC descriptors for a length of 0x400 sectors, as all these sectors were written sequentially. The host 300 then sends the stop transmission (ST) signal after reading 0x80 sectors. By the time the controller 102 receives the stop transmission (ST) signal, the controller 102 has already decoded 0x100 sectors and stored it in volatile memory in the data storage device 100 (e.g., in buffer RAM (BRAM)) for the host 300 to read. The host 300 reads 0x80 sectors out of BRAM, and 0x80 sectors are still present in BRAM. So, the total read length is equal to the total decoded host sectors (0x100)—the sectors pending in BRAM to be read (0x80).

Regarding the calculation of the total decoded host sectors, the controller 102 prepares FIM and LDPC descriptors for 0x400 sectors but needs to know how much is decoded. To do this, the controller 102 can parse the LDPC decode header buffer and get the last-decoded fragment (e.g., four kilobytes of data) and use that information to find how many fragments got decoded, which can be used to find the total length read by the host 300.

Regarding host read length estimation, the controller 102 can keep track of the incoming read command length. If the last X number (e.g. three) of command lengths are the same, on the X+1 (e.g., fourth) command onward, the controller 102 can enable estimation logic and treat the open-ended command as a close-ended command with a predicted/ remembered length. In this way, the controller 102 does not need to prepare unwanted FIM/LDPC descriptors that would need clean-up post stop transmission (ST), which can increase firmware overhead (e.g., in one example, by approximately 100 microseconds). As can be seen by this example, using command length estimation logic can reduce firmware overhead associated with post-stop-transmission clean-up activity. If the estimation fails, the controller 102 can continue reading with the estimation disabled.

Figure 6:
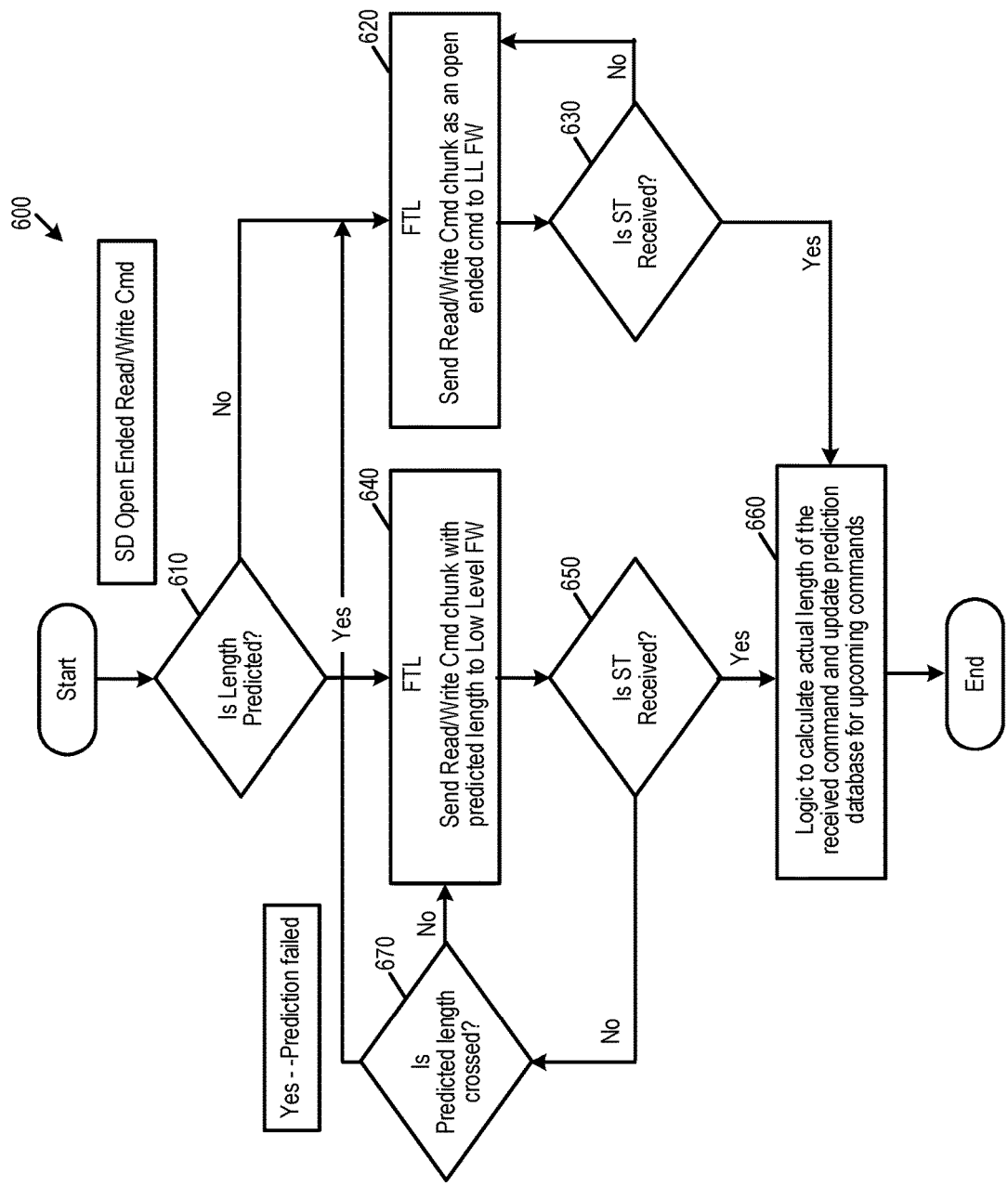
FIG. 6 is a flow chart of a method of an embodiment for increasing random input-output operations per second (IOPS).

Turning again to the drawings, FIG. 6 is a flow chart 600 of a method of an embodiment for improving random input-output operations per second (IOPS). As shown in FIG. 6, the controller 102 in the data storage device 100 determines if the length of an open-ended read/write command is predicted (act 610). If the length is not predicted, the flash translation layer (FTL)/flash control layer 132 in the controller 102 sends the read/write command chuck as an open-ended command to low-level firmware (LL FW) in the controller 102 (act 520). The controller 102 then determines if a stop transmission (ST) command is received (act 520). If a stop transmission command is received, logic in the controller 102 calculates the actual length of the received command and updates a prediction data structure (e.g., database) for upcoming commands (act 660). However, if a stop transmission command is not received, the method loops back to act 620.

In reference again to act 610, if the length is predicted, the flash translation layer (FTL)/flash control layer 132 in the controller 102 sends the read/write command chuck with the predicted length to low-level firmware (LL FW) (act 640). The controller 102 then determines if a stop transmission (ST) command is received (act 520). If a stop transmission command is received, the method proceeds to act 660, which is described above. However, if a stop transmission command is not received, the controller 102 determines if the prediction length is crossed (act 670). If the prediction length is crossed, the method proceeds to act 620; otherwise, the method proceeds to act 640, both of which are described above.

Regarding host write length estimation logic, for an open-ended write command, the controller 102 can already have logic to detect a stop transmission (ST) signal and write all received data to the memory 104, in which case the length calculation should not be an issue. The controller 102 can just enable the command length estimation logic, similar to as described above with respect to the read path, to reduce firmware overhead post stop transmission. Once the command length estimation logic is enabled, the FIM/LDPC will not prepare extra descriptors because the firmware does not require FIM/LDPC/NAND clean-up post stop transmission.

There are several advantages associated with these embodiments. For instance, these embodiments can be used to increase A1 random 4K IOPS. In one example, read performance was improved by 80-90%, and write performance was improved by 10%. Also, these embodiments can boost A1 performance for a better user experience without any extra hardware costs to identify the exact read length for length estimation. In one example, these embodiments can provide an improvement of 1,600-1,700 4 k read IOPS to 2,900-3,000 4 k read IOPS.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/ or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory; and
   one or more processors, individually or in combination, configured to:
   store a length of a previously-received read or write command;
   receive, from a host, an open-ended read or write command; and
   restrict the open-ended read or write command to the length of the previously-received read or write command, wherein restricting the open-ended read or write command to the length of the previously-received read or write command increases input-output operations per second (IOPS) by eliminating a need to perform a stop-transmission clean-up activity;
   wherein the one or more processors, individually or in combination, are further configured to estimate a length of the open-ended read or write command by:
   determining whether a threshold number of previously-received read or write commands have a same length; and
   in response to determining that the threshold number of previously-received read or write commands have the same length, treating the open-ended read or write command as a close-ended read or write command having the same length.

2. The data storage device of claim 1, wherein:
   the previously-received read or write command comprises a previously-received read command, and
   the one or more processors, individually or in combination, are further configured to calculate the length of the previously-received read command by:

parsing a low-density parity check (LDPC) decode header buffer to obtain a last-decoded fragment; and
identifying a number of fragments that were decoded.

3. The data storage device of claim 1, wherein:
the previously-received read or write command comprises a previously-received write command; and
the one or more processors, individually or in combination, are further configured to:
receive a stop transmission (ST) signal from the host; and
estimate a length of the previously-received write command.

4. The data storage device of claim 1, wherein the stop-transmission clean-up activity comprises removing an extraneous low-density parity check (LDPC) code descriptor.

5. The data storage device of claim 1, wherein the stop-transmission clean-up activity comprises removing an extraneous flash interface module (FIM) descriptor.

6. The data storage device of claim 1, wherein the stop-transmission clean-up activity comprises a memory clean-up operation.

7. The data storage device of claim 1, wherein the data storage device comprises a Secure Digital (SD) memory card.

8. The data storage device of claim 1, wherein the data storage device comprises a microSD memory card.

9. The data storage device of claim 1, wherein the memory comprises a three-dimensional memory.

10. In a data storage device comprising a memory and a controller, a method comprising:
determining whether a length of an open-ended read/write command is predicted;
in response to determining that the length of the open-ended read/write command is predicted:
sending a portion of the read/write command with a predicted length to low-level firmware in the controller;
determining whether a stop transmission (ST) command was received; and
in response to determining that the stop transmission (ST) command was received:
calculating an actual length of the read/write command; and
updating a prediction data structure for upcoming commands.

11. The method of claim 10, further comprising:
in response to determining that the stop transmission (ST) command was not received:
determining whether a prediction length was crossed; and
in response to determining that the prediction length was crossed,
sending a portion of the read/write command chuck as an open-ended command to the low-level firmware in the controller; and
determining whether a stop transmission (ST) command was received.

12. The method of claim 10, further comprising:
in response to determining that the prediction length was not crossed:
sending a portion of the read/write command chuck with a predicted length to the low-level firmware in the controller; and
determining whether a stop transmission (ST) command was received.

13. The method of claim 10, further comprising:
in response to determining that the length of the open-ended read/write command is not predicted:
sending a portion of the read/write command chuck as an open-ended command to the low-level firmware in the controller;
determining whether a stop transmission (ST) command was received; and
in response to determining that the stop transmission (ST) command was received:
calculating an actual length of the read/write command; and
updating a prediction data structure for upcoming commands.

14. The method of claim 13, further comprising:
in response to determining that the stop transmission (ST) command was not received:
sending an additional portion of the read/write command chuck as an open-ended command to low-level firmware in the controller; and
determining whether the stop transmission (ST) command was received.

15. The method of claim 10, further comprising:
in response to determining that the length of the open-ended read/write command is predicted, foregoing performing a stop-transmission clean-up activity, wherein foregoing performing the stop-transmission clean-up activity increases input-output operations per second (IOPS).

16. The method of claim 15, wherein the stop-transmission clean-up activity comprises removing an extraneous low-density parity check (LDPC) code descriptor.

17. The method of claim 15, wherein the stop-transmission clean-up activity comprises removing an extraneous flash interface module (FIM) descriptor.

18. The method of claim 15, wherein the stop-transmission clean-up activity comprises a memory clean-up operation.

19. A data storage device comprising:
a memory; and
means for:
determining whether a length of an open-ended read/write command is predicted;
in response to determining that the length of the open-ended read/write command is predicted:
sending a portion of the read/write command with a predicted length to low-level firmware;
determining whether a stop transmission (ST) command was received; and
in response to determining that the stop transmission (ST) command was received:
calculating an actual length of the read/write command; and
updating a prediction data structure for upcoming commands.

* * * * *